P. D. HARTON, DEC'D.
M. J. HARTON, EXECUTRIX.
FEEDING DEVICE FOR CAKE COATING MACHINES.
APPLICATION FILED MAY 14, 1914.
1,216,230.
Patented Feb. 13, 1917.
4 SHEETS—SHEET 1.
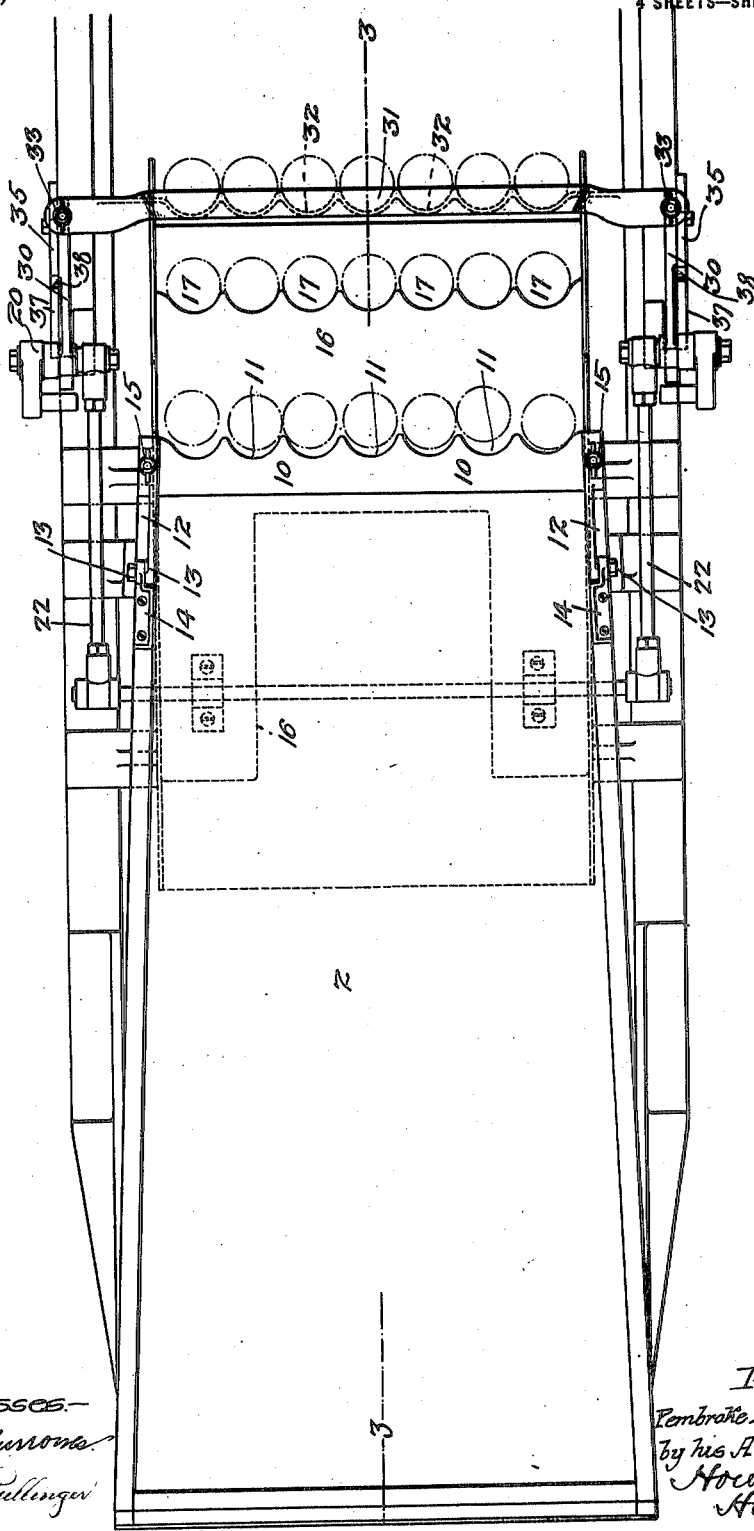

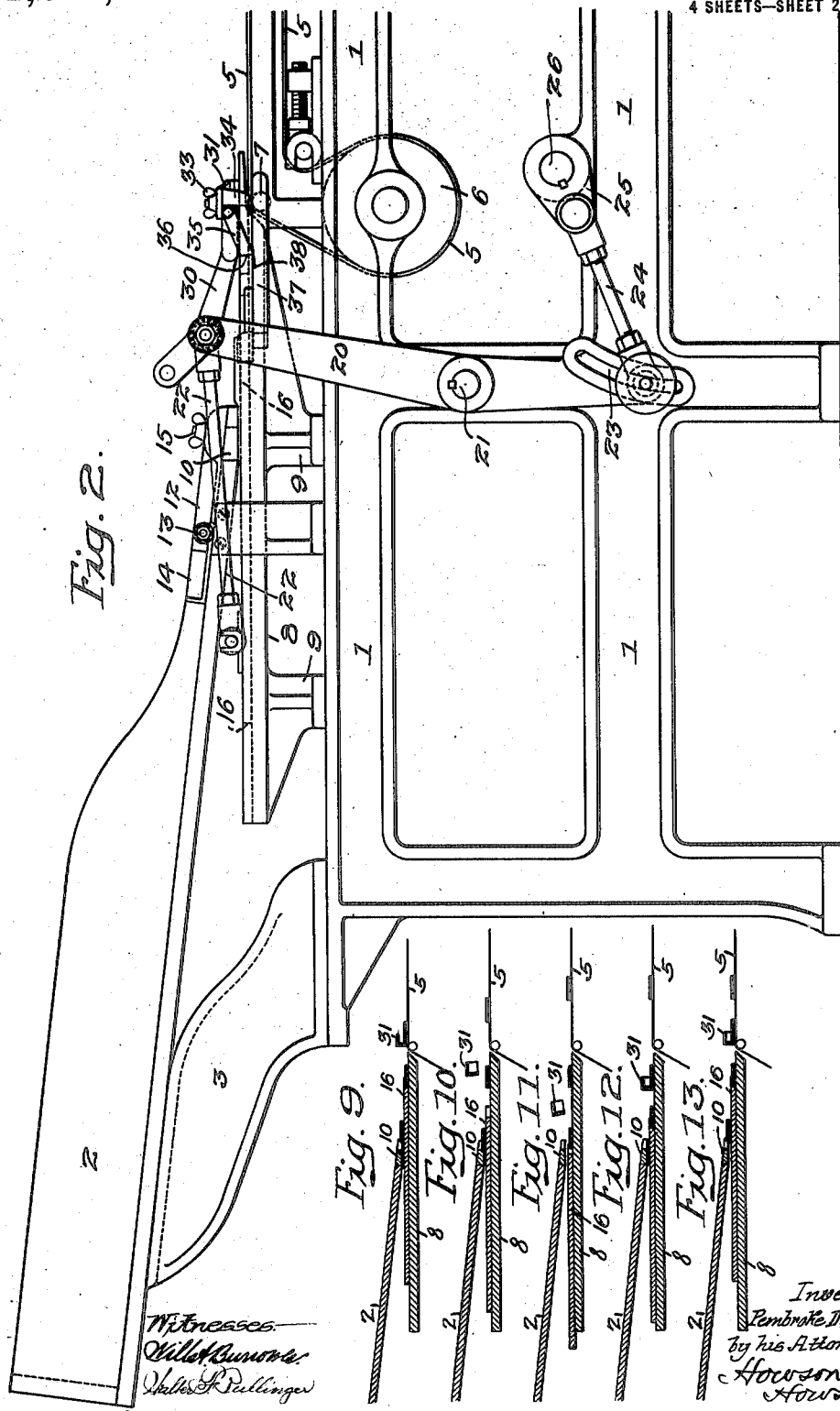

P. D. HARTON, DEC'D.
M. J. HARTON, EXECUTRIX.
FEEDING DEVICE FOR CAKE COATING MACHINES.
APPLICATION FILED MAY 14, 1914.
1,216,230.
Patented Feb. 13, 1917.
4 SHEETS—SHEET 3.
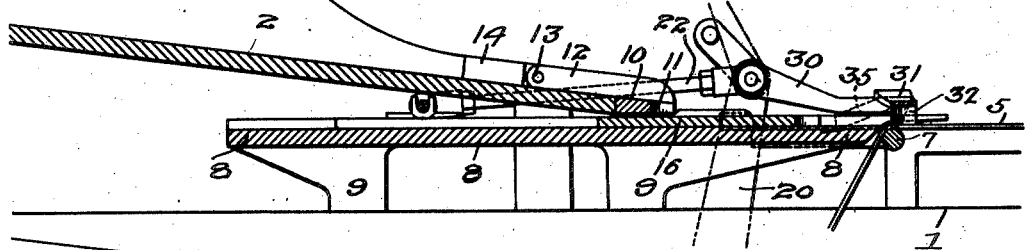
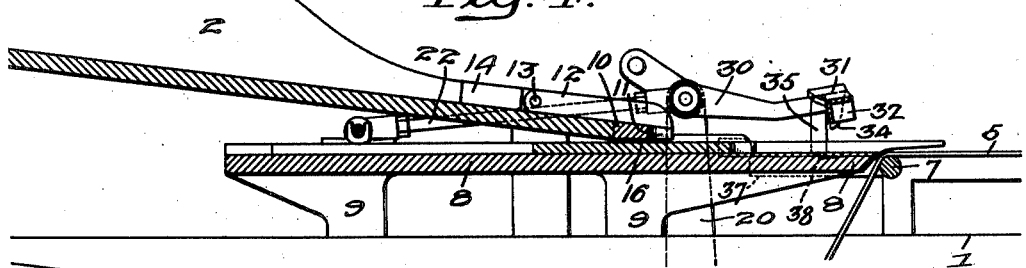
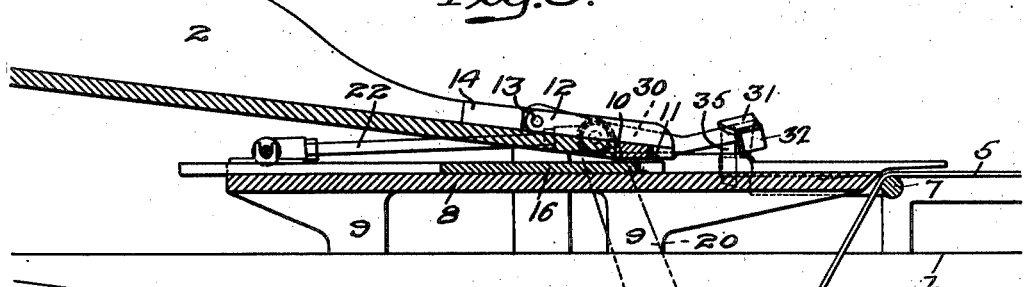
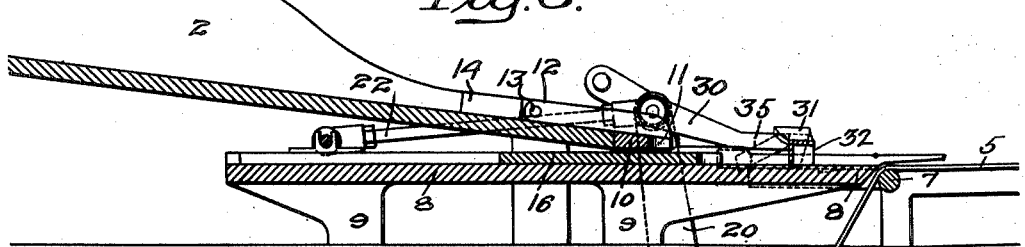

P. D. HARTON, DEC'D.
M. J. HARTON, EXECUTRIX.
FEEDING DEVICE FOR CAKE COATING MACHINES.
APPLICATION FILED MAY 14, 1914.

1,216,230.  Patented Feb. 13, 1917.
4 SHEETS—SHEET 4.

Witnesses.—
Inventor.—
Pembroke D. Harton,
by his Attorneys.—

UNITED STATES PATENT OFFICE.

PEMBROKE D. HARTON, OF PHILADELPHIA, PENNSYLVANIA; MARY J. HARTON EXECUTRIX OF SAID PEMBROKE D. HARTON, DECEASED.

FEEDING DEVICE FOR CAKE-COATING MACHINES.

1,216,230.

Specification of Letters Patent.    Patented Feb. 13, 1917.

Application filed May 14, 1914. Serial No. 838,512.

*To all whom it may concern:*

Be it known that I, PEMBROKE D. HARTON, a citizen of the United States, residing in Philadelphia, Pennsylvania, have invented certain Improvements in Feeding Devices for Cake-Coating Machines, of which the following is a specification.

My invention relates to cake coating machines; and the object of my invention is to provide means for feeding and uniformly spacing cakes and other or similar articles of confectionery upon which a coating of jelly, icing, marshmallow, or the like, is designed to be subsequently placed. The cakes so spaced are fed in regular rows beneath a suitable coating device.

These and other features of my invention will be more fully described hereinafter, reference being had to the accompanying drawings, in which:

Figure 1, is a plan view of the improved feeding mechanism forming the subject of my present invention;

Fig. 2, is a side elevation of the same;

Figs. 3, 4, 5 and 6, are sectional views on the line 3—3, Fig. 1, illustrating various positions of the feeding mechanism;

Figs. 9, 10, 11, 12 and 13, are diagrammatic views illustrating the successive positions of rows of cakes fed by the structure shown in Figs. 1 and 2.

Figure 7:
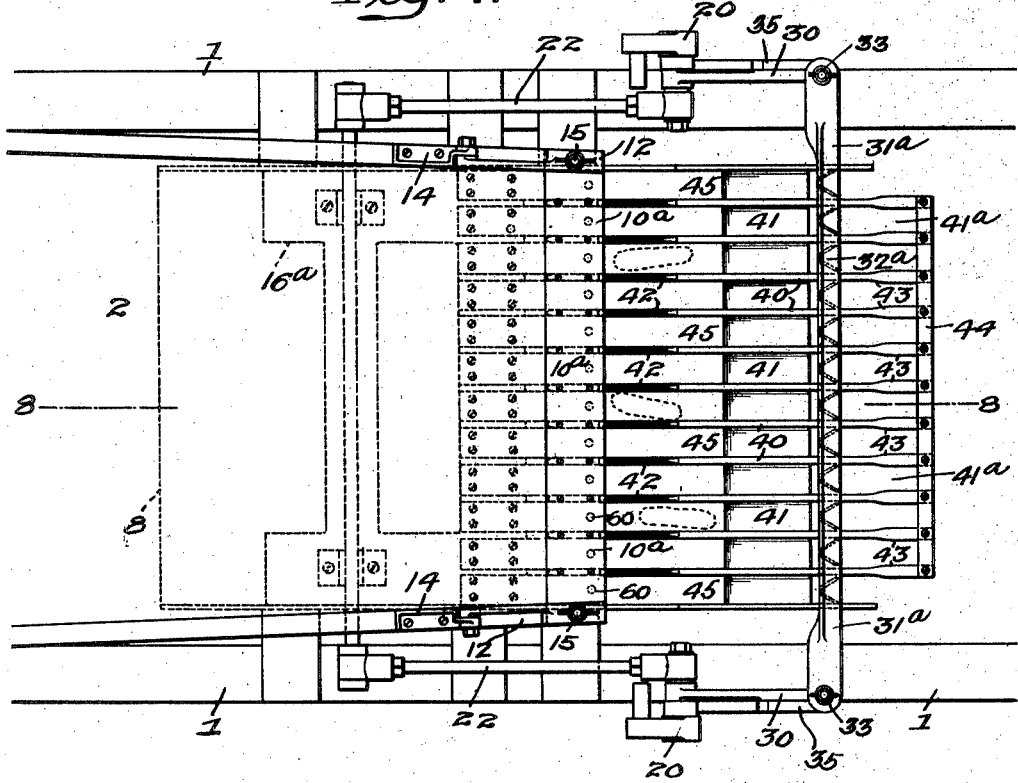
Fig. 7, is a plan view of a modified form of feeding device within the scope of my invention.

The feeding mechanism forming the subject of my invention is designed to move the cakes step by step into position with respect to a coating device, (not shown) whereby such cakes may be accurately positioned beneath discharge nozzles of such coating device, thereby insuring proper deposit of the coating material upon the several cakes or other articles of confectionery.

In the drawings, 1 represents the frame of the machine, at one end of which a suitable receiving trough 2 is mounted, preferably inclined with respect to the top of the frame, and this trough may be supported by suitable brackets 3 carried by said frame. An endless traveling belt or apron, designed to be intermittently driven is shown at 5, said belt passing over a guide or idler pulley 6, and thence over a small pulley 7 adjacent the surface of a feed table 8 disposed beneath and extending forward of the trough 2.

The feed table is disposed above the top of the frame of the machine; being mounted on supplemental supports 9, said table partly underlying the receiving trough and having its forward end in close proximity with the intermittently traveling belt or apron 5.

At the end of the receiving trough I provide a removable discharge edge 10, which may have semicircular notches or recesses 11 at the delivery side of the same, and this discharge end is preferably inclined in line with the bottom of the trough. Said discharge edge of the receiving trough, which constitutes a stop member, is preferably carried by arms 12 pivoted at 13 to brackets 14 carried by the sides of the trough; being held in place by suitable thumb nuts engaging screws 15 carried by the ends of said discharge edge and projecting through the arms 12.

Slidably mounted with respect to the feed table 8 and the bottom of the trough 2 and disposed between these two members; preferably resting on said table, is a movable push board 16, whose forward end is notched at 17; the notches or recesses of the same corresponding to or registering with the notches or recesses 11 of the discharge edge of the receiving trough.

The push board 16 is operated by means of levers 20 connected to a rock shaft 21 journaled in the frame of the machine; the upper ends of said levers being connected by means of links 22 to the push board, while their lower ends have slotted portions 23 for engagement with operating links 24 connected to crank arms 25 mounted on a shaft 26, by which said crank arms are driven. In addition, the levers 20 carry forwardly extending arms 30 between which a pusher member 31 is disposed, said pusher member having semicircular recesses 32 in its operating face which register with the semicircular recesses of the push board 16 and discharge edge 10 of the receiving trough, and motion is imparted to this member in proper relation with respect to the motion of the push board, so that a row of cakes centered by the latter on the feed table by one of its forward movements will be in position for engagement by the pusher member upon the next forward movement of the latter; being transferred by such movement from the feed table 8 to the belt or apron 5. The pusher member 31 is detachably secured to the ends of the arms 30; thumb-screws 33 being employed for the purpose. It will be understood that pusher members of various kinds will be used with different shaped cakes.

The pusher member is retracted in an elevated position so as to clear the row of cakes positioned by the push board. To accomplish this result I provide each of the arms 30 carrying the pusher member with a trailing finger 35 having a squared end 36; which fingers are adapted to trail over suitable shelves 37 at the sides of the frame, and when said pusher-member-carrying arms reach the extreme end of their forward movement, each of said fingers drops into a notch or recess 38 in the shelves, and then when the said pusher member is retracted, it will be raised by said fingers which are held in the elevated position by stops 34; the ends of the fingers seated in said recesses forming fulcrums. By this action the pusher member will be elevated to the extent of the length of the fingers, as illustrated in Figs. 4 and 5, until the extreme rearward movement of the pusher member is effected, whereupon the fingers drop off the end of the shelves and the pusher member will be in proper position with respect to the next row of cakes to be moved forward onto the endless belt or apron.

Figure 8:
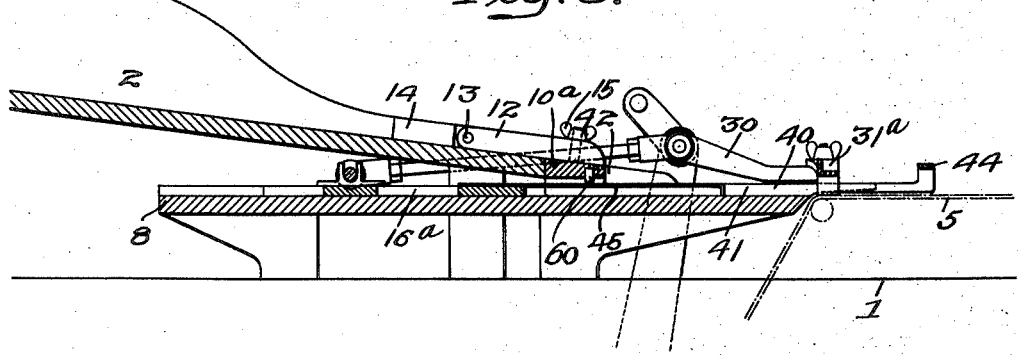
Fig. 8, is a sectional elevation on the line 8—8, Fig. 7.

In Figs. 7 and 8, I have shown a modified arrangement in which, in addition to the receiving trough, push board and pusher member, I provide guideways for the cakes. Such an arrangement is desirable for the endwise movement of cakes having a greater length than width—cakes of the general shape of a "lady finger" for instance.

For economy of space in the coating operation and to increase the output of the machine, it is desirable to move these cakes lengthwise. Under ordinary circumstances, this would be impossible, since these cakes are so light that they would be easily turned unless carefully guided. I have shown, therefore, in Figs. 7 and 8 a construction arranged to take care of cakes of this character. In this structure, the dicharge edge 10$^a$ of the receiving trough is provided with a plurality of fingers 40 forming guideways 41; the rear portions of which fingers have a reduced upper edge 42 to assist in placing the cakes from the receiving trough in said guideways, while the forward portion is substantially level and reduced in height to permit ready passage of the pusher member 31$^a$. The discharge edge 10$^a$ may also have pins 60 to prevent thin cakes sliding thereunder; also to prevent, as much as possible, any vibration of the thin sheet metal pushers 45 which work between the guides or fingers 40. The forward ends of these fingers are increased slightly in width at 43 to narrow the guideways, as indicated at 41$^a$, and said ends are supported or held in their spaced position by means of a cross bar 44. The push board 16$^a$ carries separate pushing devices 45 disposed between the fingers 40 and movable in the guideways, as clearly indicated in the drawings, and these members may be of light sheet metal if desired. The cakes are initially placed on these pushing devices 45 in the same manner as they are placed on the forwardly projecting portion of the push board of the structure as shown in Figs. 1 and 2, and as indicated by dotted lines. The operation of this particular structure is substantially the same as the operation of the structure shown in Figs. 1, 2, 3, *et seq;* the pusher member 31$^a$ having recesses 32$^a$ of a slightly different shape so as to readily engage the ends of the narrow cakes. In this instance, the pusher member delivers the cakes through the contracted ends 41$^a$ of the guideways 41 which overlie the belt or apron while such action is taking place.

In operation, the operator places cakes in the receiving trough, and these are moved over the bottom of the same to the discharge edge 10, and thence onto the push board when the latter is in the projected position, as shown in the diagrammatic view, Fig. 9. For this purpose, the operator is only required to see that a sufficient number of cakes is on the push board to equal the number of recesses or spaces and that they are disposed in the proper relative position for seating in the recesses of the end of the discharge board. This seating is accomplished by the push board on its retractive movement; the weight of the cakes being sufficient to provide enough frictional contact to insure their movement; with the push board on the retraction of the same, as shown in the diagrammatic view, Fig. 10. When the push board passes underneath the discharge edge of the trough bottom, the cakes which have been drawn back by the same enter the recesses 11, and when said board passes under the trough bottom said cakes drop onto the top of the feed table, see Fig. 11, and upon the next forward movement of the push board they are moved from their position directly at the end of the discharge edge to a position determined by the extreme forward movement of the push board. They are left in this position by retraction of the push board for engagement with a fresh row of cakes, and the pusher member during this retraction of the push board is also retracted in an elevated position over the row of cakes positioned by the push board. When said pusher member has passed over said row of cakes it is lowered into position for engagement with the same, and then on the next movement of the levers 20, one row of cakes is carried forward by the pusher member while the other row is carried forward by the push board; the cakes moved by the pusher member being delivered to the intermittently moving belt or apron.

The same action takes place in the structure shown in Figs. 7 and 8, excepting that the contracted portions of the guideways between the ends of the fingers 40 tend to center the cakes a little more definitely with respect to the nozzles of the coating machine; the pusher member 31ª moving the cakes through said contracted portions onto the belt.

By having a pivotally mounted removable discharge edge for the bottom of the cake receiving trough, changes in the character of the recesses therein can readily be provided for, for employment with cakes of different shapes and sizes; such construction also permitting the attachment of the guiding device illustrated in Figs. 7 and 8. With such changes, equivalent changes are made in the pusher members so that cakes of various sizes and shapes can be properly taken care of by this member and regularly delivered to the belt or apron 5.

It will be understood, of course, that the cake receiving trough 2 is placed at the end of the machine and mounted on top of the frame merely for convenience. It might be placed at one side of the machine. The discharge edge of such trough, however, is a fixture since it forms a rear stop for the cakes when moved back on top of the push board 16, or the pushing devices 45.

I claim:—

1. In a cake coating machine, the combination of a cake receiving trough, a discharge edge therefor pivotally connected therewith, a feed table, a sliding board interposed between the bottom of said receiving trough and the feed table, means for reciprocating said board, and fingers disposed in parallel relation and forming cake guiding means carried by and projecting forwardly of the discharge edge of said receiving trough.

2. In a cake coating machine, the combination of a cake receiving trough, a discharge edge therefor pivotally connected therewith, a feed table, a sliding board interposed between the bottom of said receiving trough and the feed table, means for reciprocating said board, cake guiding means carried by the discharge edge of said receiving trough, and separate pusher members carried by the sliding board and reciprocable between said guides.

3. In a cake coating machine, the combination of a cake receiving trough, a discharge edge therefor pivotally connected therewith, a feed table, a sliding board interposed between the bottom of said receiving trough and the feed table, a pusher member mounted for movement in advance of the sliding board, a pair of operating levers, means for driving the same, oppositely disposed connections between said levers and the sliding board and pusher member whereby the latter may be moved in unison, and forwardly projecting fingers forming cake guiding means carried by the discharge edge of said receiving trough.

4. In a cake coating machine, the combination of a cake receiving trough, a discharge edge therefor pivotally connected therewith, a feed table, a sliding board interposed between the bottom of said receiving trough and the feed table, a pusher member mounted for movement in advance of the push board, a pair of operating levers, means for driving the same, oppositely disposed connections between said levers and the push board and pusher member whereby the latter may be moved in unison, cake guiding means carried by the discharge edge of said receiving trough, and separate pusher members carried by the sliding board and reciprocable between said guides.

5. In a cake coating machine, the combination of a cake receiving trough, a discharge edge therefor, a feed table, a sliding board interposed between the bottom of said receiving trough and the feed table, means for reciprocating said board, and arms carried by the discharge edge of said receiving trough, said arms forming guideways.

6. In a cake coating machine, the combination of a cake receiving trough, a discharge edge therefor, a feed table, a sliding board interposed between the bottom of said receiving trough and the feed table, means for reciprocating said board, arms carried by the discharge edge of said receiving trough, said arms forming guideways, and separate pusher members carried by the sliding board and reciprocable in said guideways.

7. In a cake coating machine, the combination of feeding means therefor comprising a stop-member, a feed table, a sliding element interposed between the feed table and the stop-member, said element receiving the cakes to be fed, means for reciprocating said element, partitions forming a guideway for said element, and means carried by said partitions for centering the cakes.

8. In a cake coating machine, the combination of feeding means therefor comprising a stop-member, partitions carried by said stop-member forming guideways, a feed table, a sliding board interposed between the stop-member and the feed table, and means for reciprocating said board; the latter being provided with pushing elements movable in said guideways.

9. In a cake coating machine, the combination of a stop-member, a feed table, a sliding board interposed between said stop-member and the feed table, means for reciprocating said board, and arms carried by the stop-member, said arms forming guideways.

10. In a cake coating machine, the combination of a stop-member, a feed table, a sliding board interposed between said stop-member and the feed table, means for reciprocating said board, arms carried by the stop-member, said arms forming guideways, and separate pusher members carried by the sliding board and reciprocable in said guideways.

11. In a cake coating machine, the combination of a stop-member, arms carried by said stop-member and forming guideways, said guideways having discharging throats less in width than the main portion of the same, a feed table, a sliding board interposed between the feed table and said stop-member, a pusher member mounted for movement in advance of the sliding board, individual pushing elements carried by said sliding board and movable in said guideways, and means for effecting movement of the sliding board and its pushing elements and the pusher member in unison.

12. In a cake coating machine, the combination of a stop-member, a feed table, a sliding board interposed between the feed table and said stop-member, a pusher member mounted for movement in advance of the sliding board, a pair of operating levers, means for driving the same, oppositely disposed connections between said levers and the push board and pusher member whereby the two latter elements may be moved in unison, cake guiding means carried by the stop member, and separate pusher members carried by the sliding board and reciprocable between said guides.

13. In a cake coating machine, the combination of a cake receiving trough, a discharge edge therefor, arms carried by said discharge edge and forming guideways, said guideways having discharging throats less in width than the main portion of the same, a feed table, a sliding board interposed between the feed table and the bottom of said cake receiving trough, individual pushing elements carried by said sliding board and movable in said guideways, and means for effecting movement of the sliding board and its pushing elements.

14. In a cake coating machine, the combination of a cake receiving trough, a discharge edge therefor, arms carried by said discharge edge and forming guideways, said guideways having discharging throats less in width than the main portion of the same, a feed table, a sliding board interposed between the feed table and said discharge edge, a pusher member mounted for movement in advance of the sliding board, individual pushing elements carried by said sliding board and movable in said guideways, and means for effecting movement of the sliding board and its pushing elements and the pusher member in unison.

15. In a cake coating machine, the combination of a cake receiving trough, a feed table, a sliding board interposed between the feed table and said trough, a pusher member mounted for movement in advance of the sliding board, a pair of operating levers, means for driving the same, oppositely disposed connections between said levers and the push board and pusher member whereby the two latter elements may be moved in unison, partitions forming cake guiding means carried by the trough, and separate pusher members carried by the sliding board and reciprocable in said guideways, said guideways having contracted delivery throats to contact with and effect alinement of the cakes.

In testimony whereof, I have signed my name to this specification, in the presence of two subscribing witnesses.

PEMBROKE D. HARTON.

Witnesses:
MURRAY C. BOYER,
WM. A. BARR.